United States Patent
Kaufmann et al.

(10) Patent No.: US 11,874,200 B2
(45) Date of Patent: Jan. 16, 2024

(54) DIGITAL TWIN ENABLED EQUIPMENT DIAGNOSTICS BASED ON ACOUSTIC MODELING

(71) Applicant: International Business Machines Corporation, Armonk, NY (US)

(72) Inventors: John Kaufmann, Austin, TX (US); Borja Canseco, Austin, TX (US); Adriel Ricardo Estrada, El Cajon, CA (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 17/014,277

(22) Filed: Sep. 8, 2020

(65) Prior Publication Data

US 2022/0074820 A1 Mar. 10, 2022

(51) Int. Cl.
  *G01M 99/00* (2011.01)
  *G10L 25/51* (2013.01)
  *G06N 20/00* (2019.01)

(52) U.S. Cl.
  CPC .......... *G01M 99/00* (2013.01); *G06N 20/00* (2019.01); *G10L 25/51* (2013.01)

(58) Field of Classification Search
  CPC ......... G01M 99/00; G06N 20/00; G10L 25/51
  USPC .......................................................... 702/183
  See application file for complete search history.

(56) References Cited

U.S. PATENT DOCUMENTS

| | | | |
|---|---|---|---|
| 5,729,694 A * | 3/1998 | Holzrichter | G06Q 20/204 704/270 |
| 5,853,005 A | 12/1998 | Scanlon | |
| 7,557,728 B1 | 7/2009 | Bicheno | |
| 10,139,376 B2 | 11/2018 | Hershey et al. | |
| 10,416,614 B2 | 9/2019 | Wang et al. | |
| 2012/0327745 A1 * | 12/2012 | Yardibi | G01R 31/1209 367/121 |
| 2014/0136539 A1 * | 5/2014 | Knight | G06F 16/358 707/737 |

(Continued)

FOREIGN PATENT DOCUMENTS

| CN | 108427390 A | 8/2018 |
|---|---|---|
| CN | 110196575 A | 9/2019 |

(Continued)

OTHER PUBLICATIONS

Lévy, Christophe, Georges Linarès, and Pascal Nocera. "Comparison of several acoustic modeling techniques and decoding algorithms for embedded speech recognition systems." Proceedings of the Workshop on DSP in Mobile and Vehicular Systems, Nagoya, Japan. 2003. (Year: 2003).*

(Continued)

*Primary Examiner* — Aditya S Bhat
(74) *Attorney, Agent, or Firm* — Monchai Chuaychoo

(57) ABSTRACT

In an approach to digital twin enabled equipment diagnostics based on acoustic modeling, a real-time audio input of an asset is received from a mobile device. The real-time audio input is analyzed using one or more acoustic modeling algorithms to establish a deviation from a baseline, where the baseline is associated with a digital twin of the asset. Responsive to determining the deviation from the baseline exceeds a predetermined threshold, the user is iteratively directed to move the mobile device until a stopping criteria is met.

17 Claims, 3 Drawing Sheets

(56) References Cited

U.S. PATENT DOCUMENTS

| | | | | |
|---|---|---|---|---|
| 2014/0342758 | A1* | 11/2014 | Aleksy | H04W 4/023 |
| | | | | 455/456.3 |
| 2014/0376741 | A1 | 12/2014 | Kechichian | |
| 2016/0247129 | A1 | 8/2016 | Song et al. | |
| 2017/0286572 | A1* | 10/2017 | Hershey | B64F 5/60 |
| 2018/0039249 | A1* | 2/2018 | Johnson | G05B 17/02 |
| 2018/0158288 | A1* | 6/2018 | Logan | G08B 1/08 |
| 2019/0104359 | A1* | 4/2019 | Sheaffer | H04R 3/005 |
| 2019/0258747 | A1* | 8/2019 | Milev | G06F 16/9032 |
| 2019/0268697 | A1* | 8/2019 | Liu | H04R 5/02 |
| 2019/0376840 | A1 | 12/2019 | Koizumi | |
| 2020/0118053 | A1* | 4/2020 | Chapin | G06Q 10/06 |
| 2020/0265329 | A1* | 8/2020 | Thomsen | G05B 13/041 |
| 2021/0155325 | A1* | 5/2021 | Knezevic | G06F 30/20 |
| 2022/0004673 | A1* | 1/2022 | Eckenrode | G01M 99/00 |

FOREIGN PATENT DOCUMENTS

| | | |
|---|---|---|
| CN | 110530973 A | 12/2019 |
| WO | WO-2020023998 A1 * | 2/2020 |
| WO | 2022052635 A1 | 3/2022 |

OTHER PUBLICATIONS

Disclosed Anonymously et al, "Digital Twin Simuilation for Fitness-Level Validation", ip.com Prior Art Database Technical Disclosure, Jan. 8, 2020, IPCOM000260932D, pp. 1-5.

Disclosed Anonymously et al, "Method and System of Implementing Cognitive Equipment Advisor", ip.com Prior Art Database Technical Disclosure, IPCOM000261646D, Mar. 24, 2020, pp. 1-8.

Disclosed Anonymously et al, "Remote Sensing System for Engine Operation Health Monitoring: Diagnostics Using Digital Twin", ip.com Prior Art Database Technical Disclosure, IPCOM000260361D, Nov. 15, 2019, pp. 1-7.

Fuller, et al., "Digital Twin: Enabling Technologies, Challenges and Open Research", IEEE Access, vol. 8, DOI 10.1109/ACCESS.2020.2998358, 20 Pages.

Gross., "Anomaly Detection and Prediction", Oracle cloud Autonomous Prognostics, Oracle Labs, Aug. 8, 2019, pp. 1-58.

Qi, et al., "Enabling Technologies and Tools for Digital Twin", Journal of Manufacturing Systems, Oct. 29, 2019, pp. 1-20, <https://doi.org/10.1016/j.jmsy.2019,10.001>.

Rasheed, et al., "Digital Twin: Values, Challenges and Enablers", arXiv:1910.01719V1[eess.SP] Oct. 3, 2019, 31 Pages, <https://arxiv.org/pdf/1910.01719.pdf>.

International Search Report and Written Opinion, International Application No. PCT/CN2021/107385, International Filing Date Jul. 20, 2021.

Pan et al., "Cognitive Acoustic Analytics Service for Internet of Things", 2017 IEEE 1st International Conference on Cognitive Computing, DOI 10.1109/IEEE.ICCC.2017.20, pp. 96-103.

* cited by examiner

DIGITAL TWIN ENABLED EQUIPMENT DIAGNOSTICS BASED ON ACOUSTIC MODELING

BACKGROUND

The present invention relates generally to the field of data processing, and more particularly to digital twin enabled equipment diagnostics based on acoustic modeling.

A digital twin is a virtual representation of a physical object or system across its life-cycle. It uses real-time data and other sources to enable learning, reasoning, and dynamically recalibrating for improved decision making. Simply, this means creating a highly complex virtual model that is the exact counterpart (or twin) of a physical thing. The 'thing' could be a car, a tunnel, a bridge, or even a jet engine. Connected sensors on the physical asset collect data that can be mapped onto the virtual model. By viewing the digital twin, a user can now see crucial information about how the physical thing is operating in the real world.

Sound recognition is a technology based on both traditional pattern recognition theories and audio signal analysis methods. Typical sound recognition technologies contain preliminary data processing, feature extraction and classification algorithms. Feature vectors are created as a result of preliminary data processing and linear predictive coding. Sound recognition then classifies these feature vectors. An acoustic fingerprint is a condensed digital summary deterministically generated from an audio signal, that can be used to identify an audio sample or quickly locate similar items in an audio database.

SUMMARY

Embodiments of the present invention disclose a method, a computer program product, and a system for digital twin enabled equipment diagnostics based on acoustic modeling. In one embodiment, a real-time audio input of an asset is received from a mobile device. The real-time audio input is analyzed using one or more acoustic modeling algorithms to establish a deviation from a baseline, where the baseline is associated with a digital twin of the asset. Responsive to determining the deviation from the baseline exceeds a predetermined threshold, the user is iteratively directed to move the mobile device until a stopping criteria is met.

DETAILED DESCRIPTION

The world today is more connected than ever. The advent of Internet of Things (IoT) sensors and the digitization of well-defined physical assets through digital twins allows for innovation in the way technicians operate. These inventions can be enabling technology for technicians working with machinery to better diagnose malfunctions and other anomalous conditions, thus saving time and money. Every single action a machine takes produces sound. What is needed is a way for machine operators to utilize their existing mobile devices and the advancements of acoustic analyzing techniques to more accurately diagnose their equipment based on variations in the sounds they emit. The present invention will equip technicians with the best possible data for troubleshooting digital twin enabled equipment.

A digital twin is a virtual model of a process, product, or service. This pairing of the virtual and physical worlds allows analysis of data and monitoring of systems to head off problems before they even occur, prevent downtime, develop new opportunities and even plan for the future by using simulations. For example, a digital twin of an IoT device provides both the elements and the dynamics of how the device operates and lives throughout its life cycle.

Digital twins can integrate IoT, artificial intelligence, machine learning and software analytics to create living digital simulation models that update and change as their physical counterparts change. A digital twin continuously learns and updates itself from multiple sources to represent its near real-time status, working condition or position. A digital twin also integrates historical data from past machine usage to factor into its digital model.

The present invention allows a user in the field to inspect a specific component of a machine with a digital twin counterpart. The present invention records sounds from the equipment, or asset, analyzes the audio quality in real-time, and compares the acoustic signature to a digital twin of the asset. If the sound quality is not optimal, the invention will determine an optimal recording position and will direct the user to reposition the recording device accordingly. When the optimal sound quality is attained, the invention will detect anomalies in the sound from the asset based on the digital twin, and will advise the user of the part of the machine that is likely malfunctioning.

Figure 1:
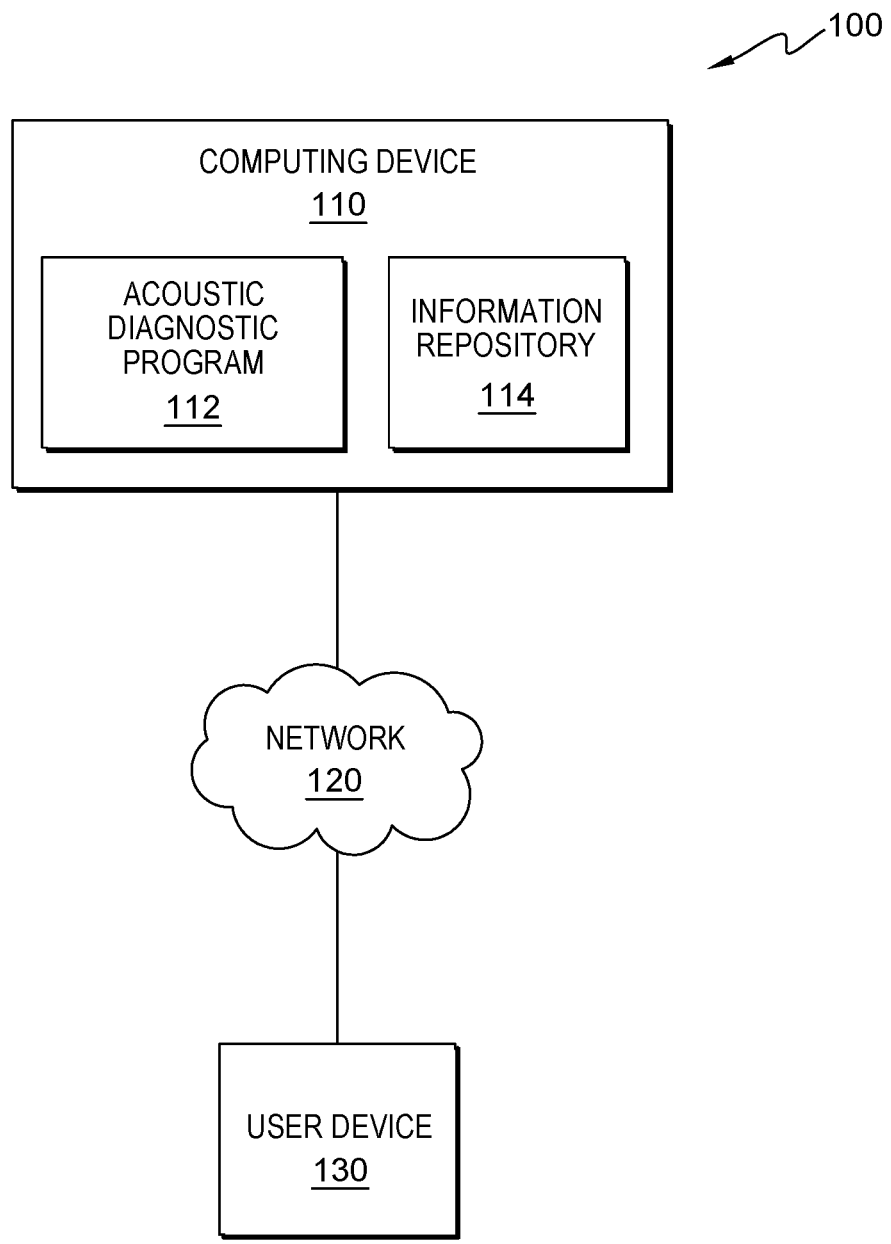
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of acoustic diagnostic program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and user device 130, both connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110, user device 130, and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes acoustic diagnostic program 112. In an embodiment, acoustic diagnostic program 112 is a program, application, or subprogram of a larger program for digital twin enabled equipment diagnostics based on acoustic modeling. In an alternative embodiment, acoustic diagnostic program 112 may be located on any other device accessible by computing device 110 via network 120.

In an embodiment, computing device 110 includes information repository 114. In an embodiment, information repository 114 may be managed by acoustic diagnostic program 112. In an alternate embodiment, information repository 114 may be managed by the operating system of the device, alone, or together with, acoustic diagnostic program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, acoustic data, digital twin data, system data, user data, and other data that is received by acoustic diagnostic program 112 from one or more sources, and data that is created by acoustic diagnostic program 112.

In an embodiment, information repository 114 may also contain a digital twin repository. In an embodiment, the digital twin repository may be separate from information repository 114, provided that the digital twin repository is accessible by computing device 110.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more tables.

User device 130 can be a smart phone, standalone computing devices, a mobile computing device, or any other electronic device or computing system that includes the ability to capture audio and is capable of receiving, sending, and processing data. In an embodiment, user device 130 can be a smart phone, a laptop computer, a tablet computer, a netbook computer, a personal computer (PC), a desktop computer, a personal digital assistant (PDA), or any programmable electronic device that includes the ability to capture audio and is capable of communicating with other computing devices (not shown) within distributed data processing environment 100 via network 120.

Figure 2:
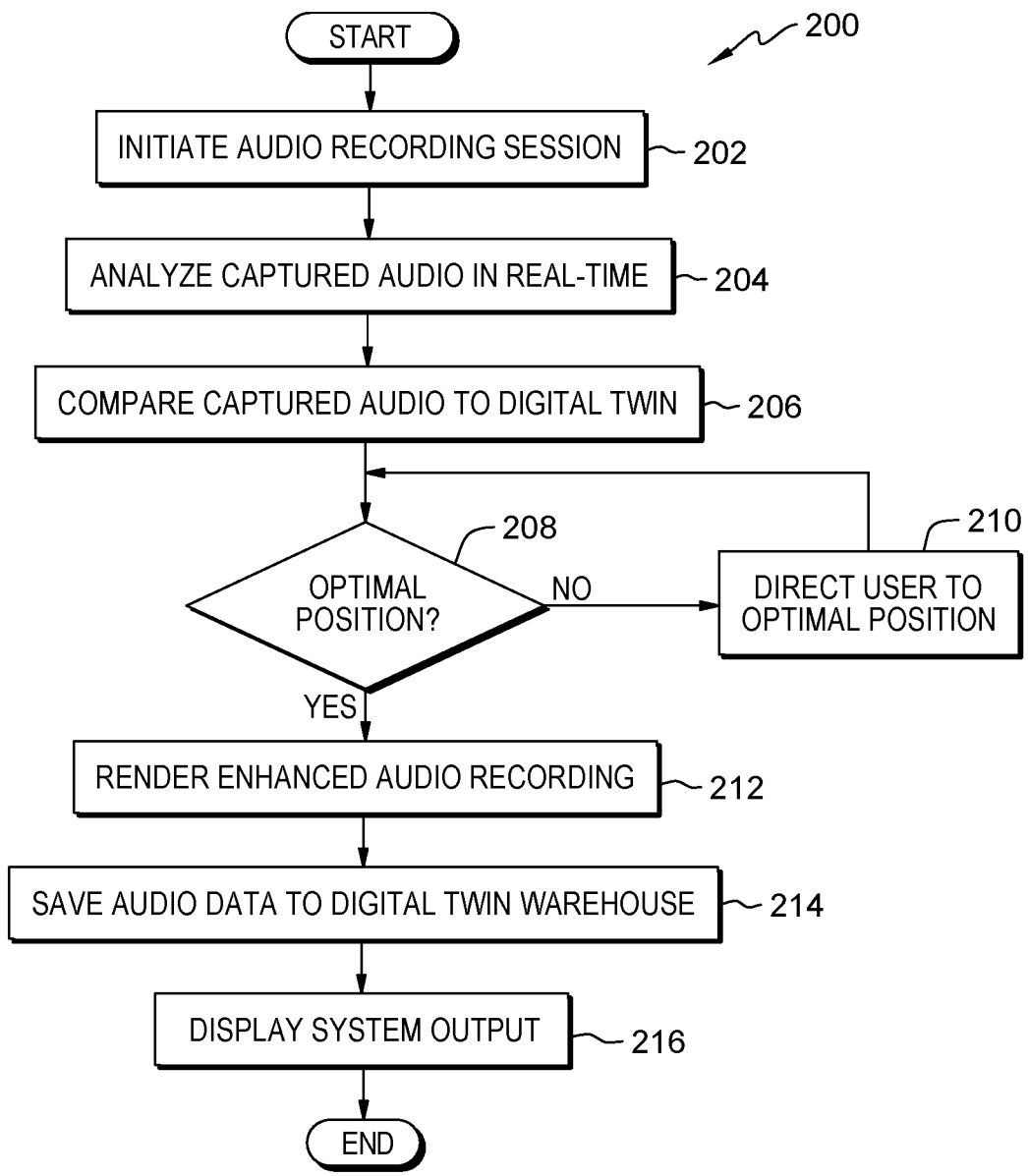
FIG. 2 is a flowchart depicting operational steps of the acoustic diagnostic program, on a computing device within the distributed data processing environment of FIG. 1, for digital twin enabled equipment diagnostics based on acoustic modeling, in accordance with an embodiment of the present invention.

FIG. 2 is a flow chart diagram of workflow 200 depicting operational steps for acoustic diagnostic program 112 for digital twin enabled equipment diagnostics based on acoustic modeling in accordance with at least one embodiment of the invention. In an alternative embodiment, the steps of workflow 200 may be performed by any other program while working with acoustic diagnostic program 112.

In an embodiment, acoustic diagnostic program 112 is initiated by a user to analyze an asset, for example, to assess the health of a machine component. In an embodiment, acoustic diagnostic program 112 uses known acoustic modeling algorithms to establish how far the current recording is deviating from a baseline established from previous recordings. In an embodiment, acoustic diagnostic program 112 leverages the digital twin of the asset (e.g., schematics, 3D models, and earlier sound profiles) to determine if any abnormalities are present in the audio recordings. In an embodiment, acoustic diagnostic program 112 determines if the position of the device recording the audio is optimal for accurate sound detection. In an embodiment, if acoustic diagnostic program 112 determines that the position of the device recording the audio is not optimal for accurate sound detection, then acoustic diagnostic program 112 directs the user where to reposition the recording device to obtain an optimal audio recording. In an embodiment, acoustic diagnostic program 112 renders an enhanced audio recording that isolates the specific abnormal sounds. In an embodiment, acoustic diagnostic program 112 stores the audio data into the digital twin data warehouse. In an embodiment, acoustic diagnostic program 112 displays the results of the analysis.

It should be appreciated that embodiments of the present invention provide at least for digital twin enabled equipment diagnostics based on acoustic modeling. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Acoustic diagnostic program 112 initiates an audio recording session (step 202). In an embodiment, acoustic diagnostic program 112 is initiated by a user to analyze an asset, for example, to assess the health of a machine component. In an embodiment, acoustic diagnostic program 112 initiates an audio recording session in response to a request from a user. In another embodiment, acoustic diagnostic program 112 initiates an audio recording session when a user opens an app on a mobile device, e.g., user device 130 from FIG. 1.

Acoustic diagnostic program 112 analyzes the captured audio in real-time (step 204). In an embodiment, acoustic diagnostic program 112 uses known acoustic modeling algorithms to establish how far the current recording is deviating from a baseline established from previous recordings. For example, acoustic diagnostic program 112 may use the Fast Fourier Transform or the Discrete Fourier Transform to convert the recording to a series of frequencies contained in the entire recording. In various embodiments, acoustic diagnostic program 112 may use sequence-to-sequence autoencoder models or a Convolutional Long Short-Term Memory autoencoder to establish how far the current recording is deviating from the baseline. In an embodiment, acoustic diagnostic program 112 retrieves the baseline established from previous recordings from a repository of acoustic data for the asset stored in information repository 114. In some embodiments, the deviation from the baseline established from previous recordings can be as simple as detecting a frequency that has not previously been detected in earlier audio recordings, e.g., a high pitched grinding noise among an otherwise low frequency hum.

Acoustic diagnostic program 112 compares the captured audio to a digital twin (step 206). In an embodiment, acoustic diagnostic program 112 leverages the digital twin of the asset (e.g., schematics, 3D models, and earlier sound profiles) to determine if any abnormalities are present in the audio recordings. In an embodiment, acoustic diagnostic program 112 establishes a baseline associated with the digital twin. For example, the digital twin would know the position of every internal part along with an acoustic "signature" of the ideal operational state of the part along with predetermined thresholds for when there is an anomaly.

Acoustic diagnostic program 112 determines if the position is optimal (decision block 208). In an embodiment, acoustic diagnostic program 112 determines if the position of the device recording the audio is optimal for accurate sound detection. In an embodiment, acoustic diagnostic program 112 uses a predetermined threshold to determine a deviation from the baseline established in the preceding step. In an embodiment, acoustic diagnostic program 112 determines if the deviation from the baseline exceeds the predetermined threshold, and if so, acoustic diagnostic program 112 iteratively directs the user to the optimal position to acquire the audio. In an embodiment, the threshold is a system default. In another embodiment, the threshold is established by the user of acoustic diagnostic program 112.

In an embodiment, acoustic diagnostic program 112 leverages the digital twin of the asset (e.g., schematics, 3D models, and earlier sound profiles) to determine if the recording location is optimal based on several factors. In various embodiments, these factors include the required closeness to commonly error-prone internal parts; the dimensions, weight, and safety information of the machine; the abnormality location in the audio recording, e.g., an abnormal frequency is more apparent on the left-channel, meaning the mobile device microphone is positioned somewhere to the right of what may be causing the malfunction; and a comparison of the audio clips received with previous recordings to match the part that is likely having an issue. In an embodiment, if acoustic diagnostic program 112 determines that the position of the device recording the audio is optimal for accurate sound detection, ("yes" branch, decision block 208), then acoustic diagnostic program 112 proceeds to step 212.

Acoustic diagnostic program 112 directs the user to an optimal position (step 210). In an embodiment, if acoustic diagnostic program 112 determines that the position of the device recording the audio is not optimal for accurate sound detection, ("no" branch, decision block 208), then acoustic diagnostic program 112 directs the user where to reposition the recording device to obtain an optimal audio recording. In an embodiment, acoustic diagnostic program 112 directs the user to the incomplete areas to capture additional audio recordings by sending movement instructions to the user device. For example, acoustic diagnostic program 112 may send an arrow to the screen of the user device to indicate to the user the direction the user should move to capture more audio recordings. In another embodiment, acoustic diagnostic program 112 directs the user to the incomplete areas to capture additional audio recordings by sending an image of the asset to the user with the location to record highlighted. In yet another embodiment, acoustic diagnostic program 112 directs the user to the area to capture additional audio recordings using any appropriate notification method as would be known to a person of skill in the art.

In an embodiment, acoustic diagnostic program 112 establishes a stopping criteria. In various embodiments, the stopping criteria may include detection of a characteristic of the real-time audio input reflecting a previously identified problem found in the digital twin of the asset; the determination of a reaching a required closeness to a known error-prone location of the asset; or the detection of a characteristic of the real-time audio reflecting a new problem not found in the digital twin of the asset. When acoustic diagnostic program 112 determines that the stopping criteria has been met, then acoustic diagnostic program 112 notifies the user that the current location is the optimal location for capturing the audio.

Acoustic diagnostic program 112 renders an enhanced audio recording (step 212). In an embodiment, acoustic diagnostic program 112 renders an enhanced audio recording that isolates the specific abnormal sounds. In an embodiment, acoustic diagnostic program 112 uses other acoustic data from the multi-positioned audio recordings to produce an enhanced audio recording using existing acoustic processing methods. In an embodiment, acoustic diagnostic program 112 combines the different recordings taken (multi-positioned audio recordings) to create the best recording for storage and evaluation, e.g., stereo vs mono.

Acoustic diagnostic program 112 saves the audio data to a digital twin warehouse (step 214). In an embodiment, acoustic diagnostic program 112 stores the audio data into information repository 114. In an embodiment, acoustic diagnostic program 112 stores the audio data into the digital twin data warehouse, which is part of information repository 114. In an embodiment, acoustic diagnostic program 112 feeds the audio data into a machine learning model that helps with future diagnostic sessions on the same piece of equipment as the unit under test.

Acoustic diagnostic program 112 displays the system output (step 216). In an embodiment, acoustic diagnostic program 112 displays the results of the analysis for the user. In an embodiment, acoustic diagnostic program 112 displays the results of the analysis on a user device, e.g., user device 130 from FIG. 1. In an embodiment, the user uses this information to determine the malfunction of the asset, or whether further diagnostics are required to confirm the malfunction. Acoustic diagnostic program 112 then ends for this cycle.

Figure 3:
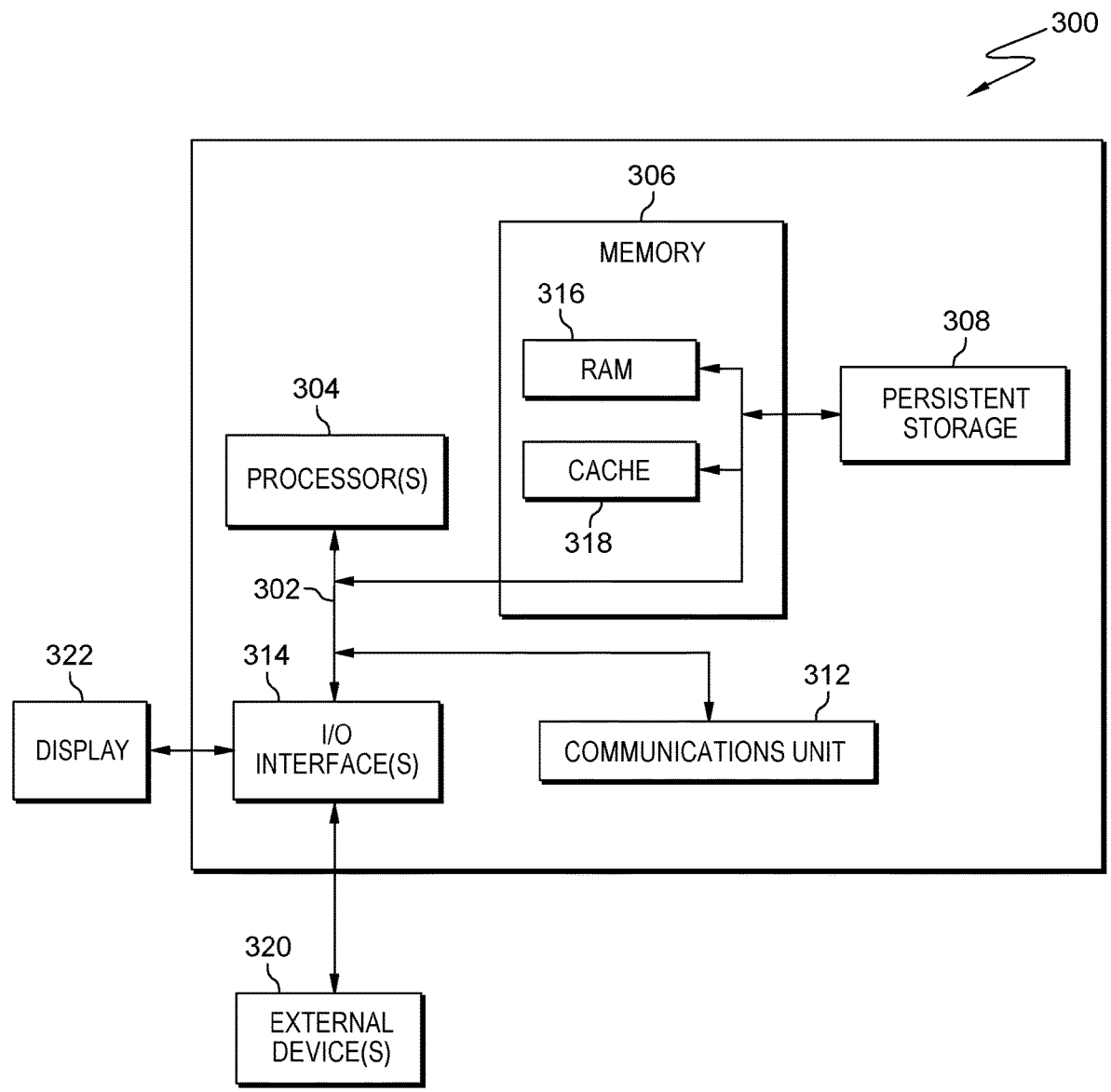
FIG. 3 depicts a block diagram of components of the computing devices executing the acoustic diagnostic program within the distributed data processing environment of FIG. 1, in accordance with an embodiment of the present invention.

FIG. 3 is a block diagram depicting components of computing device 110 suitable for acoustic diagnostic program 112, in accordance with at least one embodiment of the invention. FIG. 3 displays the computer 300, one or more processor(s) 304 (including one or more computer processors), a communications fabric 302, a memory 306 including a random-access memory (RAM) 316 and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and I/O interface(s) 314. The communications fabric 302 may be implemented with an architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a RAM 316 and a cache 318. In general, the memory 306 can include any suitable volatile or non-volatile computer readable storage media. Cache 318 is a fast memory that enhances the performance of processor(s) 304 by holding recently accessed data, and near recently accessed data, from RAM 316.

Program instructions for acoustic diagnostic program 112 may be stored in the persistent storage 308, or more generally, any computer readable storage media, for execution by one or more of the respective computer processors 304 via one or more memories of the memory 306. The persistent storage 308 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

The communications unit 312, in these examples, provides for communications with other data processing systems or devices. In these examples, the communications unit 312 includes one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allows for input and output of data with other devices that may be connected to computer 300. For example, the I/O interface(s) 314 may provide a connection to external device(s) 320 such as a keyboard, a keypad, a touch screen, a microphone, a digital camera, and/or some other suitable input device. External device(s) 320 can also include portable computer readable storage media such as, for example, thumb drives, portable optical or magnetic disks, and memory cards. Software and data used to practice embodiments of the present invention, e.g., acoustic diagnostic program 112, can be stored on such portable computer readable storage media and can be loaded onto persistent storage 308 via the I/O interface(s) 314. I/O interface(s) 314 also connect to a display 322.

Display 322 provides a mechanism to display data to a user and may be, for example, a computer monitor. Display 322 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for equipment diagnostics by leveraging digital twin technology, the computer-implemented method comprising:
    receiving, by one or more computer processors, a real-time audio input of an asset from a mobile device, wherein the asset has been simulated in a digital twin simulation and the asset is machinery;
    analyzing, by the one or more computer processors, the real-time audio input using one or more acoustic modeling algorithms to establish a deviation from an initial baseline sound profile,
    responsive to determining the deviation from the initial baseline sound profile exceeds a predetermined threshold, iteratively directing, by the one or more computer processors, a user to move the mobile device to an optimal recording location until stopping criteria is met, wherein the stopping criteria is detection of a characteristic of the real-time audio input reflecting a previously identified problem found in the digital twin of the asset and wherein the optimal recording location is based on factors, required closeness to commonly error-prone internal part of a machine, abnormality frequency location recorded and comparison of the real-time audio input against previous recording;
    rendering the real-time audio input to isolate specific abnormal sound; and
    combining multi-positioned audio recording of the real-time audio input to create recording for storage and evaluation.

2. The computer-implemented method of claim 1, wherein the stopping criteria is a determination of a reaching a required closeness to a known error-prone location of the asset.

3. The computer-implemented method of claim 1, wherein the stopping criteria is a detection of a characteristic of the real-time audio reflecting a new problem not found in the digital twin of the asset.

4. The computer-implemented method of claim 3, wherein the stopping criteria is the detection of the characteristic of the real-time audio reflecting the new problem not found in the digital twin of the asset further comprises:
    responsive to determining the new problem is a malfunction of the asset, updating the digital twin to include information about the new problem.

5. The computer-implemented method of claim 1, further comprising:
capturing, by the one or more computer processors, the real-time audio input of the asset; and
updating, by the one or more computer processors, a machine learning model of the asset with the real-time audio input, wherein the machine learning model is used for future diagnostics sessions of the asset.

6. The computer-implemented method of claim 1, further comprising:
capturing, by the one or more computer processors, the real-time audio input of the asset; and
updating, by the one or more computer processors, the digital twin of the asset with audio input.

7. A computer program product for equipment diagnostics by leveraging digital twin technology, the computer program product comprising:
one or more computer readable storage devices and program instructions stored on the one or more computer readable storage devices, the stored program instructions comprising instructions to:
receive a real-time audio input of an asset from a mobile device, wherein the asset has been simulated in a digital twin simulation and the asset is machinery;
analyze the real-time audio input using one or more acoustic modeling algorithms to establish a deviation from an initial baseline sound profile;
responsive to determining the deviation from the initial baseline sound profile exceeds a predetermined threshold, iteratively direct a user to move the mobile device to an optimal recording location until stopping criteria is met, wherein the stopping criteria is detection of a characteristic of the real-time audio input reflecting a previously identified problem found in the digital twin of the asset and wherein the optimal recording location is based on factors, required closeness to commonly error-prone internal part of a machine, abnormality frequency location recorded and comparison of the real-time audio input against previous recording;
rendering the real-time audio input to isolate specific abnormal sound; and
combining multi-positioned audio recording of the real-time audio input to create best recording for storage and evaluation.

8. The computer program product of claim 7, wherein the stopping criteria is a determination of a reaching a required closeness to a known error-prone location of the asset.

9. The computer program product of claim 7, wherein the stopping criteria is a detection of a characteristic of the real-time audio reflecting a new problem not found in the digital twin of the asset.

10. The computer program product of claim 9, wherein the stopping criteria is the detection of the characteristic of the real-time audio reflecting the new problem not found in the digital twin of the asset further comprises one or more of the following program instructions, stored on the one or more computer readable storage media, to:
responsive to determining the new problem is a malfunction of the asset, update the digital twin to include information about the new problem.

11. The computer program product of claim 7, further comprising one or more of the following program instructions, stored on the one or more computer readable storage media, to:
capture the real-time audio input of the asset; and
update a machine learning model of the asset with the real-time audio input, wherein the machine learning model is used for future diagnostics sessions of the asset.

12. The computer program product of claim 7, further comprising one or more of the following program instructions, stored on the one or more computer readable storage media, to:
capture the real-time audio input of the asset; and
update the digital twin of the asset with audio input.

13. A computer system for equipment diagnostics by leveraging digital twin technology, the computer system comprising:
one or more computer processors;
one or more computer readable storage media; and
program instructions stored on the one or more computer readable storage media for execution by at least one of the one or more computer processors, the stored program instructions comprising instructions to:
receive a real-time audio input of an asset from a mobile device, wherein the asset has been simulated in a digital twin simulation and the asset is machinery;
analyze the real-time audio input using one or more acoustic modeling algorithms to establish a deviation from an initial baseline sound profile;
responsive to determining the deviation from the initial baseline sound profile exceeds a predetermined threshold, iteratively direct a user to move the mobile device to an optimal recording location until stopping criteria is met, wherein the stopping criteria is detection of a characteristic of the real-time audio input reflecting a previously identified problem found in the digital twin of the asset and wherein the optimal recording location is based on factors, required closeness to commonly error-prone internal part of a machine, abnormality frequency location recorded and comparison of the real-time audio input against previous recording;
rendering the real-time audio input to isolate specific abnormal sound; and
combining multi-positioned audio recording of the real-time audio input to create best recording for storage and evaluation.

14. The computer system of claim 13, wherein the stopping criteria is a determination of a reaching a required closeness to a known error-prone location of the asset.

15. The computer system of claim 13, wherein the stopping criteria is a detection of a characteristic of the real-time audio reflecting a new problem not found in the digital twin of the asset.

16. The computer system of claim 15, wherein the stopping criteria is the detection of the characteristic of the real-time audio reflecting the new problem not found in the digital twin of the asset further comprises one or more of the following program instructions, stored on the one or more computer readable storage media, to:
responsive to determining the new problem is a malfunction of the asset, update the digital twin to include information about the new problem.

17. The computer system of claim 13, further comprising one or more of the following program instructions, stored on the one or more computer readable storage media, to:
capture the real-time audio input of the asset; and
update a machine learning model of the asset with near real-time audio input, wherein the a machine learning model is used for future diagnostics sessions of the asset.

* * * * *